United States Patent
Maus

(10) Patent No.: US 6,534,021 B1
(45) Date of Patent: Mar. 18, 2003

(54) HEAT-RESISTANT AND REGENERATABLE FILTER BODY WITH FLOW PATHS AND PROCESS FOR PRODUCING THE FILTER BODY

(75) Inventor: Wolfgang Maus, Bergisch Gladbach (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/166,697

(22) Filed: Oct. 5, 1998

Related U.S. Application Data

(63) Continuation of application No. PCT/EP98/00292, filed on Jan. 20, 1998.

(30) Foreign Application Priority Data

Feb. 4, 1997 (DE) .......................................... 197 04 147

(51) Int. Cl.[7] .......................... F01N 3/28; B01D 53/94; B01D 46/10; B01J 35/04
(52) U.S. Cl. ...................... 422/180; 422/171; 422/177; 55/DIG. 30
(58) Field of Search ............................... 422/180, 179, 422/177, 174, 221, 199, 222, 171; 55/DIG. 10, DIG. 30, 481, 521; 60/301, 299, 300

(56) References Cited

U.S. PATENT DOCUMENTS 4,154,568 A  5/1979  Kendall et al. ................. 431/7

FOREIGN PATENT DOCUMENTS

| DE | 27 33 640 A1 | 2/1979 |
|----|----|----|
| DE | 29 51 316 A1 | 7/1981 |
| DE | 33 30 020 A1 | 2/1985 |
| DE | 35 01 182 C2 | 7/1986 |
| DE | 87 00 787.8 U1 | 12/1987 |
| DE | 37 44 265 C2 | 7/1989 |
| EP | 0 134 002 B1 | 3/1985 |
| EP | 606071 | * 7/1994 |
| EP | 747579 | * 12/1996 |
| JP | 57-163 112 A | 10/1982 |
| JP | 59-73053 | * 4/1984 |

* cited by examiner

Primary Examiner—Hien Tran
(74) Attorney, Agent, or Firm—Laurence A. Greenberg; Werner H. Stemer; Ralph E. Locher

(57) ABSTRACT

A heat-resistant and regeneratable filter body, which can preferably be coated with catalytically active material, for retaining particles from a gas flow flowing through the filter body, has flow paths for the gas flow. The flow paths are separated from each other and at least a first filter stage and a second finer filter stage are disposed in succession in flow direction in the respective flow paths. A process for the production of a heat-resistant and regeneratable filter body for retaining particles, in particular soot particles, from a gas flow flowing through the filter body, preferably from an internal combustion engine, provides predetermined flow paths. In a production procedure for the flow paths in the filter body, at least a first filter stage and a second finer filter stage are disposed simultaneously in a flow path. The first and second filter stages, as viewed in flow direction through the filter body, lie in succession along the flow path.

15 Claims, 6 Drawing Sheets

HEAT-RESISTANT AND REGENERATABLE FILTER BODY WITH FLOW PATHS AND PROCESS FOR PRODUCING THE FILTER BODY

CROSS-REFERENCE TO RELATED APPLICATION:

This application is a continuation of copending International Application No. PCT/EP98/00292, filed Jan. 20, 1998, which designated the United States.

BACKGROUND OF THE INVENTION

Field of the Invention

The present invention relates to a filter body for retaining particles from a gas flow flowing through the filter body, including flow paths for the gas flow. The filter body is heat-resistant and regeneratable. The invention also relates to a process for the production of a heat-resistant and regeneratable filter body which serves for retaining particles, in particular soot particles, from a gas flow flowing through the filter body, preferably from an internal combustion engine. The filter body which is produced in that way also has predetermined flow paths.

A preferred area of use of the invention is an application thereof in the field of exhaust gas filtering in relation to internal combustion engines. Environmental awareness which is ever increasingly growing world-wide has resulted in endeavors being made, particularly in that area, to find ways of reducing, cleaning and neutralizing emissions and ultimately reducing them to a potential which is as low as possible for mankind and its environment. In the middle of the Eighties, for example, that directed attention to soot particles in relation to motor vehicles. Various filter structures were also produced for being able to filter such particles out of exhaust gases. Set out below is an overview of some filter installations which are known in the state of the art and to the structural configurations, materials and disclosure of which the invention also has recourse.

German Patent DE 37 44 265 C2 discloses a soot filter for exhaust purification in connection with internal combustion engines, which has corrugation configurations and fold configurations for changing direction of exhaust gas in the soot filter. Flat filter material is integrated into the layers of the soot filter. A production process for introducing corrugation configurations and fold configurations is also described, wherein bar portions extending transversely at spacings are introduced into steel sheets being used. German Published, Non-Prosecuted Patent Application DE 33 30 020 A1 discloses a Diesel exhaust gas filter including wire mesh having sieve mesh configurations that are illustrated in many different forms. Respectively open and closed end surface portions are disposed in a mutually opposite relationship, thereby predetermining the flow path in that Diesel exhaust gas filter. The closed end surface portions are produced by squashing components of the Diesel exhaust gas filter. European Patent 0 134 002 B1 shows configurations which are possible in that respect and discloses a production process for winding a sieve mesh with a cover layer to form a gas-permeable assembly. A further document, German Published, Non-Prosecuted Patent Application DE 29 51 316 A1, describes a catalytic filter for Diesel exhaust gas purification, which includes a metal sieve mesh configuration with alternate layers of corrugated sieve mesh and a closed cover layer. The surfaces of the filter are closed by a cover device in such a way that a closed end surface portion is disposed opposite an open end surface portion. The filter action of that catalytic filter is achieved by way of the mesh width and by way of the porosity of an oxide layer to be applied to the sieve mesh. Another technical way of producing flow paths in a filter body is illustrated in German Published, Non-Prosecuted Patent Application 27 33 640. A carrier matrix is described for a catalytic reactor for exhaust gas purification in connection with internal combustion engines, with coated steel surfaces. Raised portions and recessed portions in a steel sheet co-operate in form-locking relationship with an adjacent steel sheet whereby flow paths are formed in the carrier matrix. German Patent DE 37 44 265 C2 again discloses a soot filter, wherein layers of corrugated or folded material are closed transversely with respect to the longitudinal direction of the corrugation or fold.

Besides the filters which have just been described above and which are made from metal sheets or foils, the state of the art also includes extruded or ceramic filters. German Utility Model G 87 00 787.8 discloses a soot filter for Diesel engines, wherein ceramic fibers which are disposed in a random or irregular array form an open-pore filter body. Embedded in the filter body is a heating wire which is intended to heat substantially the entire volume of the filter body to a temperature. Patent Abstracts of Japan 57-163112 discloses a soot filter in which ceramic foam is surrounded on both sides by metal foils. The metal foils can be heated with electrical energy. The ceramic foam with the metal foils is wound or coiled to form a filter body. German Patent DE 35 01 182 C2 discloses an exhaust gas filter for Diesel engines, which includes a monolithic filter block of porous ceramic. That filter block has a multiplicity of passages extending in the main flow direction of the exhaust gas. The passages are closed alternately by plugs which are introduced into the same. The plugs are intended to cause the exhaust gas to flow through more than one passage wall in succession. In that configuration the porosity of the passage walls which are connected in succession by the operative plugs is intended to decrease in the through-flow direction. The reduction in porosity is intended to be achieved by applying a porosity-reducing agent to a filter block blank, wherein multiple application is intended to produce different zones of varying porosity over the exhaust gas filter produced in that way. That exhaust gas filter is very expensive to produce due to the necessary plugs and the wall coating which is required a plurality of times under some circumstances. Division of the monolithic filter block into zones of different wall coating porosity is intended to considerably reduce a back pressure upstream of the filter, which increases with increasing operating life. The configuration of the flow through the filter block, which is compelled by virtue of its structure, admittedly ensures that the gases flow through successively disposed porosity zones. However, it is not possible to gather information about the precise flow path. In addition, individual gas flows are repeatedly mixed together in the filter block and due to the effects which occur in that situation, they produce an undesirable pressure drop in the filter block itself.

SUMMARY OF THE INVENTION

It is accordingly an object of the invention to provide a heat-resistant and regeneratable filter body with flow paths and a process for producing the filter body, which overcome the hereinafore-mentioned disadvantages of the heretofore-known devices and processes of this general type, in which the body combines a high level of filter capacity with low pressure drops in a filtration effect and in terms of through-flow, production thereof is to be possible in a small number of working steps and the process permits a particularly labor-saving structure with respect to filter bodies.

With the foregoing and other objects in view there is provided, in accordance with the invention, a heat-resistant and regeneratable filter body for retaining particles from a gas flow flowing through the filter body, comprising mutually separate flow paths for a gas flow; and at least one respective first filter stage and one respective second finer filter stage disposed in succession in flow direction in each of the flow paths.

Separation of the flow paths ensures on one hand that a predetermined defined path through the individual filter stages is followed by each partial gas flow. On the other hand, pressure losses by virtue of mixing phenomena with respect to different partial gas flows are prevented. Separation of the individual flow paths also facilitates the structural configuration of the filter body. The respective filter stages in a flow path are then disposed independently of adjacent flow paths.

The first filter stage retains particles which are of a certain minimum size from the gas flow flowing therethrough. It therefore serves as a kind of coarse filter which prevents the larger impurities that are present in terms of surface area and/or volume from flowing further through the filter. The gas flow which is thus filtered for the first time is then taken to a second finer filter stage. The latter is then capable of filtering particles out of the gas flow which are smaller in comparison with those which were retained at the first filter stage. Dividing up the filtering action through the filter body into different filter stages has the advantage, as considered over a filter surface of a filter stage, that there are always sufficient intermediate spaces through which particles that are even finer than the particles to be filtered out in that filter stage can flow through the same. If there were only one filter stage with a single, predetermined maximum permissible permeability, under some circumstances a much too great pressure drop would be found to occur, in the event of all filtered-out particles accumulating. The use of filter stages which are disposed in succession in a flow path means that the loading with particles is also distributed over a plurality of filter surfaces, while the overall loading due to particles is also distributed to the individual, mutually separated flow paths. In operation, corresponding to the magnitude of the filter surfaces of the filter stages, when added together, the configuration affords a lower pressure drop in comparison with a filter involving a single level of porosity if the flow paths for the filter surfaces which are added together have an advantageous structural configuration in terms of flow dynamics.

In many uses it is sufficient for the flow body to have two filter stages. However, in accordance with another feature of the invention, depending on the area of use of the invention, the nature of the particles and the particle loading in the gas flow, under some circumstances it is more desirable for three or more filter stages with the sizes of the filter openings decreasing in the flow direction to be disposed in the filter body. In that way it is possible for the filtration process to be implemented in the filter body, in a very finely controlled and metered manner. If it is known, for example, that there is primarily a given particle size in the gas flow to be filtered, and that particle size has a certain width of dispersion with respect to its dimensions, the use of a plurality of filter stages which are very close together in regard to their filter opening sizes provides for distribution of the filtration effect to a plurality of filter stages. Overloading of an individual filter stage in that way is eliminated from the outset.

In accordance with a further feature of the invention, the heat-resistant and regeneratable filter body has alternate layers of filter material and layers of gas-impermeable material. The layers of filter material have a filter opening size which decreases in the flow direction while the layers of gas-impermeable material form flow guide surfaces. The flow guide surfaces deflect the gas flow two or more times so that it has to cross the layers of filter material two or more times. While the flow guide surfaces serve to form the flow paths and the mutual separation thereof, the layers of filter material predominantly form the respective filter stages. The filter material can be, for example, a sieve mesh, as well as a braid or other known heat-resistant filter substances. For example, they may be fiber filters or ceramic foam filters. An example of the latter would be polyurethane foams which are impregnated with filter material (Corderite or A 1203), then dried and then calcined. Fiber filters in turn are heavily dependent in their effect on the interplay of the fiber diameters with the particle diameter. In order to provide the filtration of Diesel particles in motor vehicle exhaust gases with a particle size of between 0.1 and 1 $\mu$m diameter, fiber diameters of about 4 to 30 $\mu$m are highly effective. In order to achieve adequate stability, in particular in regard to regeneratability, the fiber diameters can also be selected to be larger, in dependence on the material involved. Moreover it is also possible to use steel wool filters, having a wire diameter which is, for example, 0.25 mm. The layers of fiber material and gas-impermeable material can be formed of metal but they can equally also be of ceramic material. Limitations in regard to the choice of material arise at most by virtue of the conditions under which the filter body is used.

In accordance with an added feature of the invention, in an advantageous area of use, involving retaining particles from internal combustion engines, in particular soot particles from Diesel engines, the temperature development in regeneration of the filter body represents a limit in regard to filter body materials, like the temperature of the gas flow itself when flowing through the filter body. With a catalytic non-precious metal coating, it is possible to reduce the soot ignition temperature from about 500° C. to about 400° C. The use of metallic fuel additives makes it possible to even reduce the ignition temperature to 150° C. It is to be noted, however, that, for example, when travelling, in the event of the soot burning off, under adverse conditions temperatures of 1400° C. and more could also occur. However, they are prevented by a configuration of a filter body, in accordance with the invention. In regard to other uses of the filter body, the limitations in regard to the materials being used arise, for example, by virtue of necessary acid resistance, the erosion which occurs by virtue of the nature of the particles, and their flow rate or other influencing parameters.

However, the costs of the structural configuration of the flow paths are also dependent on the area of use of the filter body. The flow paths may be provided by gaps between layers and, as in an embodiment of the invention, by virtue of mutually spaced-apart walls, for example of different extruded circular sleeves, cases or tubes at different spacings, which when fitted one into the other provide a filter body. If the filter body is subjected from the exterior to the effect of the gas flow to be filtered, then the filtered gas flow can be discharged from the interior of the last extruded tube member. The sleeves, cases or tubes can be connected together, for example by a support device. Another possible way of holding those tubes, each of which act as a filter stage, involves supporting them at their end surfaces.

In accordance with an additional feature of the invention, in the event of a radial flow through the filter body, the end surfaces must be closed in order to form the flow paths from the exterior inwardly of such a filter. Advantageously, the permeability of the filter stages also decreases in that direction. That through-flow direction has the advantage of ensuring that the largest particles are also caught at the outermost tube member or case which naturally has the largest surface area. However, by virtue of the size of the surface area of the tube, the fact that the large particles are retained does not result in the pressure drops being as high as would occur at, for example, the innermost tube, with the same gas and particle flow acting thereon.

In accordance with yet another feature of the invention, another structural configuration of the flow paths provides the same in the form of flow passages. Accordingly, the filter body can be wound or coiled, layered, extruded or produced in any other manner. In particular, structures which are to be considered as a flow passage are configurations of flow guide surfaces which form and/or subdivide a cross-section through which the gas flow is to pass and which is smaller than other dimensions of the filter body.

In one structural configuration the filter stages again are formed from individual filters while in another structural configuration the filter stages are also formed from a plurality of filters as a layered configuration.

In accordance with yet a further feature of the invention, the filter body has a stacked and/or wound layer with a metal foil, with a first and/or second filter being incorporated into the layer. In that way the layer can be shaped as desired, while in the case of a filter body it can also contribute to the stability thereof. The integration of one or two filters into a layer with a metal foil also makes it possible to use materials for the filter which in themselves do not have an adequate level of strength or a specific structural configuration, for example loose fillings or the like. In that configuration a filter is associated with a filter stage.

In accordance with yet an added feature of the invention, the configuration of a filter stage or a plurality of successive filter stages provides that the first and the second filter form an interconnected or coherent filter. That can mean that the interconnected filter extends over a plurality of flow paths or that the filter stages which are disposed in succession are interconnected by the filter itself. The filter can be, for example, a metal mesh, in which case the mesh spacing of the metal mesh varies over its length and thereby provides different filter stages. It is, however, also possible to consider other filters which are known from the above-mentioned state of the art.

In accordance with yet an additional feature of the invention, in order to make particularly effective use of a filter stage or a filter, it is disposed in a plane in a flow passage in such a way that a cross-sectional area of the filter stage in the flow passage, which can be acted upon with gas to be purified, is larger than the smallest cross-sectional area through that flow passage. Distribution of the gas flow over a larger surface area when passing through the filter stage in comparison with the cross-sectional area of the passage, on one hand avoids major pressure drops since more openings are made available for the gas flow therethrough in a filter stage. On the other hand, that configuration makes it more difficult for those openings to become blocked by virtue of the increased number in comparison with a filter stage disposed perpendicularly in the cross-section. Furthermore, in that way the filter or the filter stage is also structurally useful. In particular, it can be disposed in such a way that it makes a contribution to the stability of the filter body just as to the elasticity thereof. In an embodiment of a filter body the filter stage is therefore deformable under loading. That deformability may be plastic but it may equally also be elastic, depending on the loadings which are to be envisaged in the appropriate area of use of the filter body.

In accordance with again another feature of the invention, the filter body has a filter stage with a trap at which filtered particles of that filter stage preferably accumulate. The term trap is used in this case on one hand to denote a spatial configuration in which, by virtue of the flow through the filter stage, a suitable geometry thereof permits a migration movement of the retained particles at the filter stage. The migration movement can be guided by suitable construction of the filter stage. For that purpose the filter stage may have recesses, grooves, constrictions, grid-like devices as well as guide surfaces. On the other hand, the term trap is used to denote all those devices which at a filter stage ensure that there is a virtual main point of attraction for the particles that are retained. They may be of a chemical, physical or electrical nature.

In accordance with again a further feature of the invention, accumulations of particles in and around the trap, which occur at the filter stages when gases flow through the filter body for a prolonged period of time, facilitate regeneratability of the filter body. When the filter body is in use over a long period of time, its filter effect decreases, as considered in relation to time. An attempt must therefore be made to at least approximately regain the original filter action.

In accordance with again an added feature of the invention, the filter body has measures for regeneration of the filter stage, at least adjacent the trap. The regeneration device may be a device for thermal conversion of the particles which have accumulated there. However, other steps such as, for example, discharge flow passages for the particles or the like are also possible. Regeneration of the filter body can be effected chemically, thermally or mechanically, while the selected mode of regeneration generally depends on a number of parameters. A decision is to be made as to whether mechanical removal, for example by shaking the particles out or by floating them off, is more advantageous than other possible regeneration modes, depending on the respective structure of the filter body, the materials used in relation thereto, and the installation in which the filter body is disposed. It will be appreciated that the nature of the particles retained and their behavior, for example whether they cake together or the like, accordingly also plays a part. It may also be advantageous if different filter stages of the filter body can also be regenerated differently. For example, in the case of filter stages which are downstream in the flow direction, it may be desirable for the particles which are particularly fine there to be thermally converted while the coarser particles at the filter stages which are more upstream in the flow direction would be better disposed of by mechanical measures. The choice of regeneration procedure is therefore also dependent on energy aspects.

In accordance with again an additional feature of the invention, the filter body at least partially has a catalytically active coating. This can serve for conversion of the gas flow flowing through the filter body, but it can also serve a function for the filter body itself. This can be an increase in the temperature of a part of the filter body or the entire filter body by virtue of the catalytic reaction, as well as possible regeneration of a filter stage. The filter body can be used in chemical installations just as in installations dealing with exhaust or waste gases, in which the gas flow is at such high temperatures that filter bodies which are not heat-resistant would be damaged.

In accordance with still another feature of the invention, in the case of a use in connection with Diesel motor vehicles, it is particularly advantageous to provide two different catalytically active coatings in the honeycomb body in order to specifically and deliberately improve certain properties. Thus the conversion of nitrogen oxides in the exhaust gas into harmless components is possible at its most effective when there are hydrocarbons which can bind the oxygen to be reduced by the nitrogen oxide.

In accordance with still a further feature of the invention, the first stage of the filter body is provided with a coating which promotes the reduction effect, for splitting up nitrogen oxides. It is only thereafter that there follows a coating for promoting oxidation of the hydrocarbons which have remained (and carbon monoxide, if present).

In accordance with still an added feature of the invention, at the same time or alternatively it is possible to provide the various layers with different coatings, in particular the gas-permeable layers in which soot accumulates with a catalytically active coating that reduces the soot ignition temperature, and the gas-impermeable layers with a coating for promoting the oxidation of hydrocarbons.

In accordance with still an additional feature of the invention, the filter body is heatable. This can be effected electrically but also in other ways, for example by a chemical action, by heat transfer or the like.

In accordance with another feature of the invention, the first and/or the second filter stage is directly heatable. On one hand, that makes it possible to heat the gas flow while on the other hand, the filter stage can also be regenerated in that way. Heating of the filter body can therefore involve the entire body, but it may equally also involve only certain parts thereof. That can be controlled by the structure of the filter body and, for example, by virtue of the electrical connections, when using an electrical heating configuration. In particular, the filter body can be constructed in such a way that it has surfaces which heat up particularly vigorously while in comparison other surfaces have only a certain degree of heating action.

With the objects of the invention in view there is also provided a process for the production of a heat-resistant and regeneratable filter body for retaining particles, in particular soot particles, from a gas flow flowing through the filter body, preferably from an internal combustion engine, which comprises producing predetermined flow paths while simultaneously disposing at least a respective first filter stage and a respective second finer filter stage in each flow path; and placing the first and second filter stages in succession along the flow paths in a flow direction through the filter body.

In accordance with another mode of the invention, such a process presents itself in particular for a filter body with a first and a second filter stage, as has already been described above. The process enjoys the advantage of elimination a subsequent filter stage which is to be fitted into the filter body after production thereof, as a working step in the process. As a result the process not only enjoys a time saving in comparison with the previous processes in the state of the art, but it also enjoys cost advantages in comparison therewith. Therefore, in accordance with the invention the term "simultaneously" is used also to denote the working step in which a flow path is produced, for example in the case of sheet metal layers by applying various ones thereof or when winding or coiling the same.

In accordance with a concomitant mode of the invention, if the configuration involves an extruded body, the process can be implemented in such a way that, upon extrusion of the filter body, its porosity is attained by changing or selecting a porosity of an extrusion material in accordance with a desired porosity of a filter stage. That can be achieved by virtue of different dimensions with respect to the extrusion material or materials being used. When dealing with slurries, they are, for example, respectively mixed with different porosities. If a filter body is to be sintered, it is possible in this case for the sintering mold to be filled with different sintering material sizes, in accordance with the desired porosity of a filter stage. Suitable apparatuses for the production of a filter body of that kind advantageously have mixing devices, which permit a change in the sizes of material used in the production of the filter body. Depending on the filter stage desired, the process can be implemented in such a way that on one hand there is a steady transition from one porosity to the other, while on the other hand the process also permits a specific demarcation between two different porosities.

Other features which are considered as characteristic for the invention are set forth in the appended claims. Although the invention is illustrated and described herein as embodied in a heat-resistant and regeneratable filter body with flow paths and a process for producing the filter body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
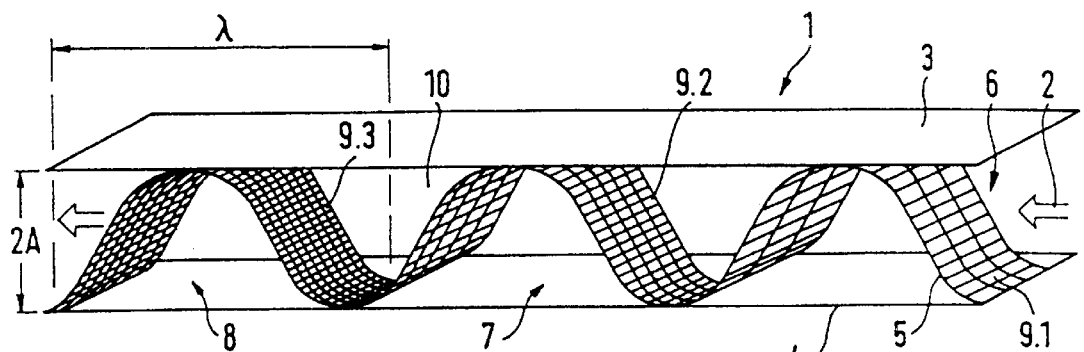
FIG. 1 is a diagrammatic, perspective view of a portion of a filter body which has a first filter stage and a second finer filter stage.

Referring now to the figures of the drawings in detail and first, particularly, to FIG. 1 thereof, there is seen a portion of a filter body 1 through which a gas flow 2 flows. The illustrated portion of the filter body 1 shows an upper layer 3, a lower layer 4 and a corrugated layer 5 of filter material therebetween. The upper layer 3 and the lower layer 4 are gas-impermeable and form flow guide surfaces. The corrugated layer is disposed between the flow guide surfaces and has a plurality of filter stages. A first filter stage 6 has a lower number of openings through which the gases can flow, than two subsequent filter stages, namely a second filter stage 7 and a third filter stage 8. Openings 9.1, 9.2 and 9.3 in the respective filter stages 6, 7 and 8 are of ever decreasing dimensions in the flow path of the gas flow 2. Differences in such dimensions are characterized by different widths of the openings 9.1, 9.2 and 9.3. The successively disposed filter stages 6, 7 and 8 therefore also filter out different particle sizes. The filter material of the corrugated layer 5 can be ceramic but it may equally also be metal wire or metal mesh. In the embodiment shown in FIG. 1, the gas flow 2 flows through a flow path 10 formed between the upper layer 3 and the lower layer 4, without a change in direction caused thereby. It will be appreciated that a certain change in direction occurs due to bar portions or webs which surround the openings 9.1, 9.2 and 9.3. In the flow path 10, the layer 5 of filter material has such a corrugated configuration that the gas flow 2 flows through the corrugated layer 5 twice over a corrugation length $\lambda$. The distance $\lambda$ is not necessarily prescribed and corrugation configurations involving different dimensions are also possible. That concerns not only the corrugation length but also the amplitude A thereof. The latter may decrease or also increase, as viewed over the filter body. As a result thereof, there are different flow rates in the filter body, which can be advantageous depending on the particle loading in the gas flow 2. The layer 5 of filter material which forms the individual filter stages 6, 7 and 8 may also be creased or folded or may adopt other geometries. The transition from one filter stage to the next also does not have to occur at the regular distance of the corrugation length $\lambda$, as illustrated herein. On the contrary, the transition between the first filter stage 6 and the second filter stage 7 may be progressively variable, depending on the respective production process for forming the layer 5.

Figure 2:
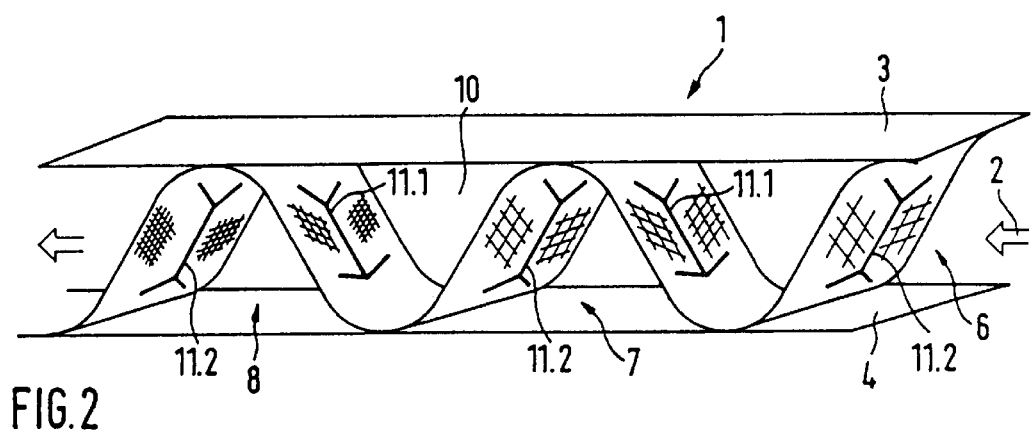
FIG. 2 is a perspective view of a portion of another filter body which has a first and a second filter stage each having a trap.

FIG. 2 again shows a portion of a filter body 1 which has a first filter stage 6, a second filter stage 7 and a third filter stage 8, once again between an upper layer 3 and a lower layer 4. The individual filter stages 6, 7 and 8 have first and second traps 11.1, 11.2. The traps 11.1, 11.2 are in the form of a kind of dip or depression in the respective filter stages 6, 7 and 8. In the incoming flow direction for the respective filter stage, the first trap 11.1 has a dip or depression in the direction of the flow of the gas flow 2 along the flow path 10, whereas the second trap 11.2 is in the opposite direction to the flow. While particles will accumulate in the center at the first trap 11.1, the second trap 11.2 distributes the incoming particles at both sides. A configuration corresponding to the first trap 11.1 is desirable in particular when the particle loading in the gas flow 2 is not so great that the accumulation of particles at a single location would result in excessively high pressure drops. In the event of a risk of clogging of the filter stage, a configuration corresponding to the second trap 11.2 is more advantageous, by virtue of distribution of the particles. A filter stage may also have a plurality of traps.

Figure 3:
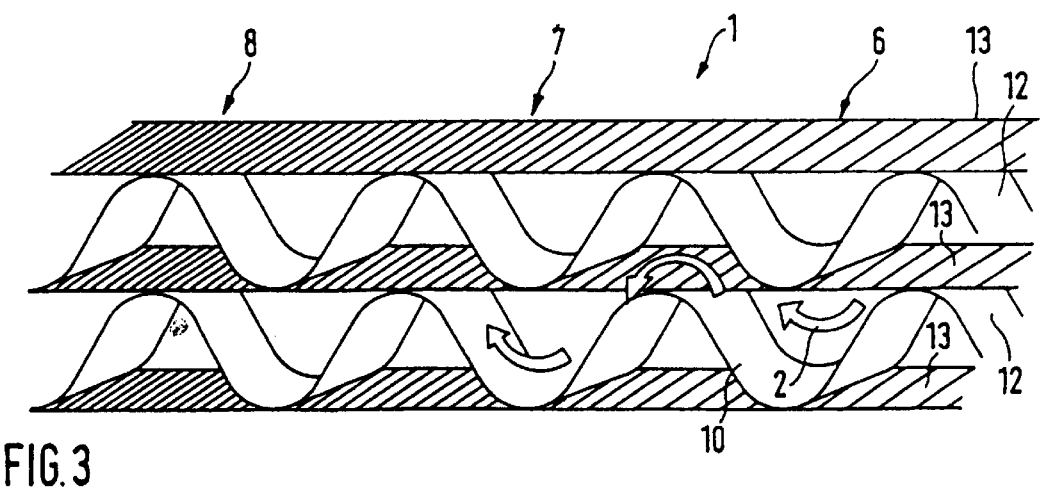
FIG. 3 is a perspective view of a portion of a filter body which has a change in direction of flow of a gas flow to be filtered.

FIG. 3 shows a portion of a filter body 1 which has first layers 12 of gas-impermeable material and second layers 13 of filter material. The first layers 12 are provided in such a way that the gas flow 2 is changed in direction a plurality of times, so that it crosses the second layers 13 of filter material a plurality of times. The second layers 13 have interconnected filter stages, namely the first filter stage 6, the second filter stage 7 and the third filter stage 8. In this embodiment the gas-impermeable layers 12 which form the flow guide surfaces are corrugated, whereas the interposed filter material of the second layers 13 lies smoothly on the respective corrugations. Therefore, the gas flow 2, as considered over the length of the filter body, covers a longer distance in comparison with filter bodies shown in FIGS. 1 and 2. If the gas flow 2 is to be treated in the filter body 1, whether thermally or catalytically, the most appropriate filter shape can be selected in dependence on the desired dimensions and the necessary flow path. The configuration in addition also affords a different mixing effect in comparison with that which occurs in the two filter bodies described above, in accordance with the changes in direction in a filter body 1 as shown in FIG. 3.

A further configuration of a filter body 1 has flow guide surfaces which at least in part additionally have further guide surfaces that provide for a further mixing effect. They may be openings as well as structures that are known in connection with motor vehicle catalytic converters of Emitec Gesellschaft Fur Emissionstechnologie MBH, the assignee of the instant application. As the gas flow 2 flows a plurality of times through the second layers 13 with identical filter openings corresponding to the respective first, second or third filter stages 6, 7 and 3 as shown, the second layers 13 of a further embodiment have additional non-illustrated openings at the beginning of one of the respective filter stages. The gas flow can then impinge in an unfiltered condition through those openings onto the subsequent part of the respective filter stage. In that way, step-wise retention of the particles is achieved within the filter stage. For that purpose the number of such additional openings most desirably progressively decreases in the flow direction, as viewed over the flow path 10. The last part of a filter stage then does not have any additional opening, as far as possible.

Figure 4:
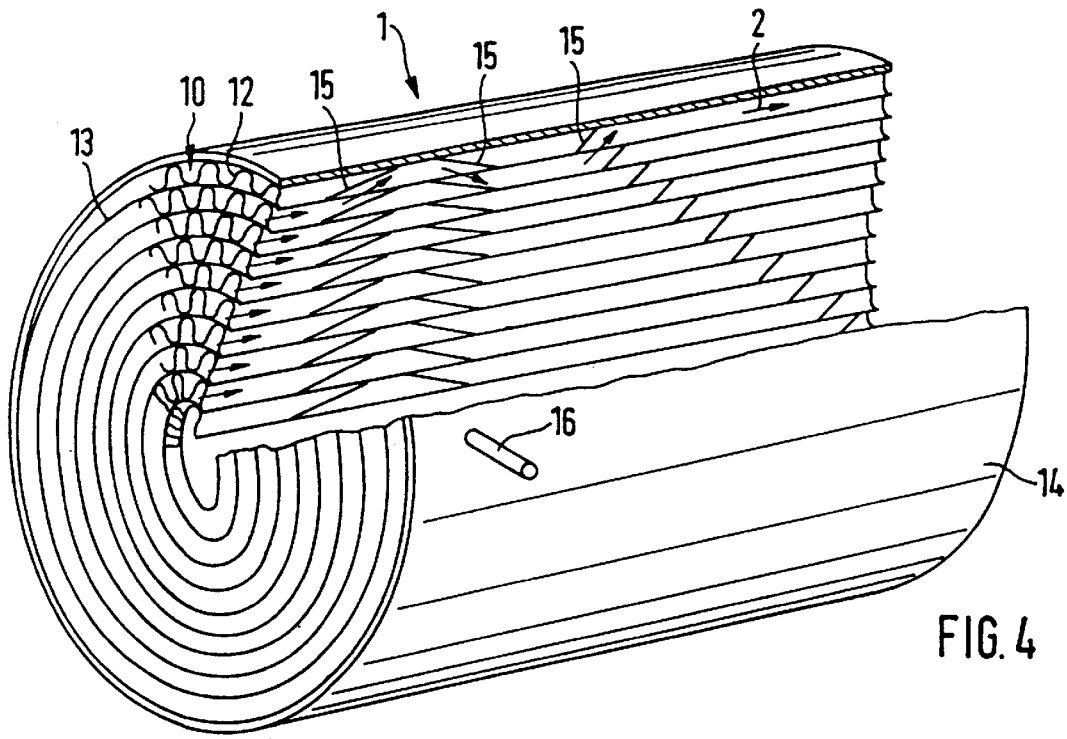
FIG. 4 is a partly broken-away perspective view of a filter body having flow paths with radial-axial deflections.

FIG. 4 shows a filter body 1 having flow paths 10 with radial-axial deflections or changes in direction. The filter body 1 is embedded in a tubular casing 14 and is made up of wound or coiled first layers 12 of gas-impermeable material and second layers 13 of filter material. The second layers 13 of the filter material also extend in a straight line, as in the example of FIG. 3. The wound gas-impermeable layers 12 in contrast are admittedly corrugated, but this time the corrugation configuration itself extends perpendicularly to the direction of flow of the gas flow 2 through the filter body 1. The first layers 12 in FIG. 4 are oriented and shaped in such a way that they can deflect the respective flow path 10 along the axial line of the filter body 1 as well as radially. Thus deflections 15 can be disposed in a mutually parallel relationship in the filter body 1 in regard to their geometrical configuration, or in a displaced relationship, as occurs further downstream in the flow direction in the filter body 1. The tubular casing 14 also has an electrical connection 16 with which the entire filter body 1 or only parts thereof can be connected to an electrical power source. It is desirable for the structure of the filter body 1 to be provided in such a way that electrically conductive paths are established within the filter body 1.

Figure 5:
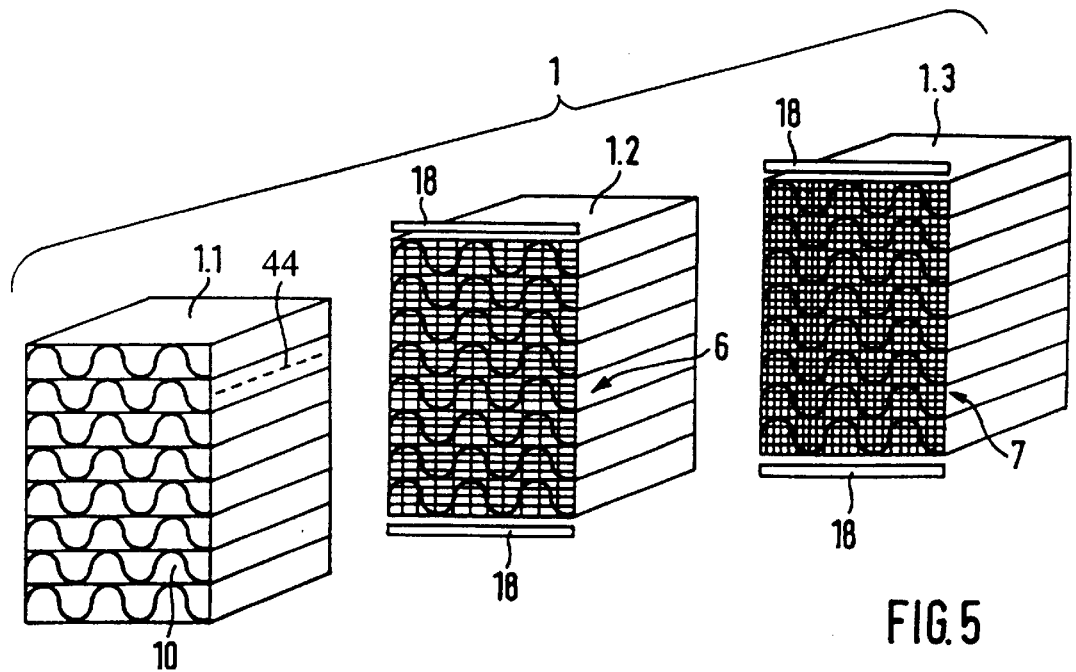
FIG. 5 is an exploded, perspective view of a further filter body.

FIG. 5 shows a further filter body 1, this time in an exploded view. Three portions 1.1, 1.2 and 1.3 of the filter body 1 are extruded, sintered or made up of layers, and form the filter body 1 when assembled. Flow passages 44 which are indicated by a broken line in the portion 1.1, are provided as the flow paths 10 in the respective portions 1.1, 1.2 and 1.3. A first filter stage 6 and a second filter stage 7 disposed between the portions 1.1 and 1.2, and between the portions 1.2 and 1.3, respectively. In the case of this multi-part filter body 1, the two filter stages 6 and 7 can simply be disposed between the portions 1.1, 1.2 and 1.3 or can be held in suitable fixings on the portions 1.1, 1.2 or 1.3. On one hand, a multi-part filter body 1 of this kind affords the advantage of being able to be enlarged as desired by further adding portions and filter stages, by virtue of its modular structure. The filter stages 6 and 7 in turn can be relatively easily fitted and removed again, which greatly facilitates interchange of a respective filter stage, as may possibly be necessary. That may be necessary, for example, as a result of corrosion or erosion effects at a filter stage. This configuration of the filter stages 6 and 7 between the portions 1.1 and 1.2 or 1.2 and 1.3, respectively, also permits a power connection to be made without an excessively great amount of structural problems. If the filter stage 6 or 7 is formed of metal, it only has to be connected to a power source by way of suitable connections, as is indicated by power connection bars 18. Depending on the respective structural configuration of the power connection bar 18, the configuration 1T may involve preferred, electrically heatable components of the respective filter stage 6 or 7. That may be in particular a trap at which the filtered particles accumulate. Electrical insulation in relation to other electrically conductive components of the filter body 1 is afforded, for example, in the fixings of the filter stages. The filter stage also does not have to be made of metal throughout. It is also possible to use filter stages including hybrid or mixed materials. The filter body 1 may also have a non-illustrated catalytic coating. The catalytic coating may be provided throughout or only in a portion-wise manner, preferably on surfaces defining the flow paths. In the case of a multi-part filter body 1 as shown herein it is also possible for different catalytic coatings to be provided by virtue of a respective coating in a portion 1.1, 1.2 or 1.3 of the filter body 1 and thus to be combined in the same.

Figure 6:
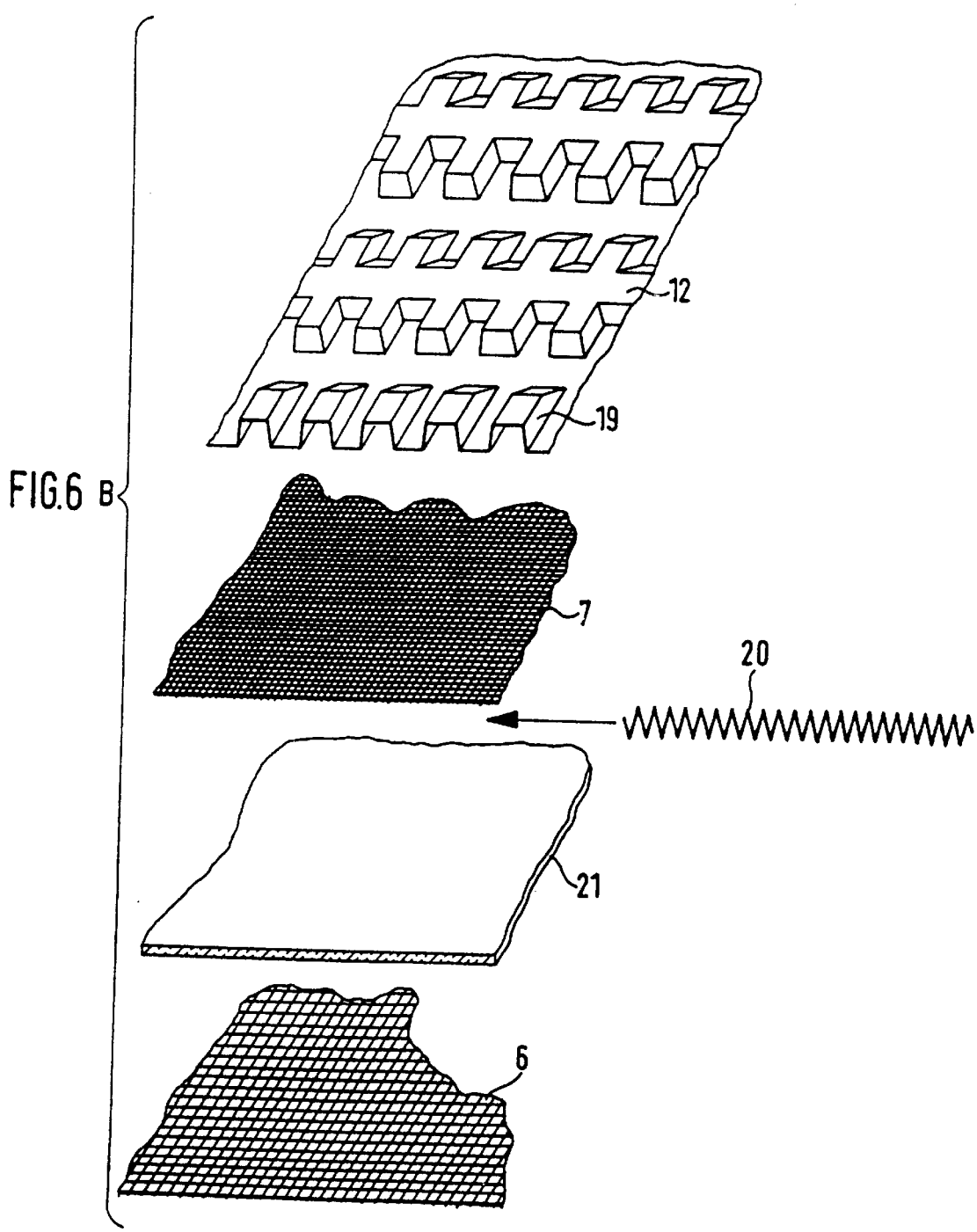
FIG. 6 is a fragmentary, exploded, perspective view of a structure of a layer of a filter body.

FIG. 6 shows an example of a structure B of a flow path in an embodiment of a filter body. The structure B is formed of a gas-impermeable first layer 12 with flow guide surfaces 19, a first filter stage 6, and bearing against them an electrically heatable incandescent device 20 and a porous insulating layer 21 which electrically separates the incandescent device 20 from a second filter stage 7. This structure B which is shown in an exploded view would in turn have a corresponding structure B connected thereto. However, the further structure B may also have a different configuration. The illustrated first layer 12 together with an adjacent non-illustrated first layer 12 forms a flow path 10 which is separated from other flow paths 10 of the filter body 1. However, the flow guide surfaces 19 of the first layers 12 are provided in such a way that a mixing effect can perfectly occur within the flow path. Nevertheless, the configuration always ensures that the gas flow when flowing along its flow path 10 reliably flows through a first filter stage 6 and a second filter stage 7. The first filter stage 6 and the second filter stage 7 can be heated directly or indirectly, as illustrated therein by the incandescent device 20. The structure B illustrated herein has only one incandescent device 20. While coarser particles are retained at the first filter stage 6, the second filter stage 7 retains finer particles. In that case the insulating layer 21 can serve as buffer volumes insofar as the retained finer particles accumulate there between the first filter stage 6 and the second filter stage 7. Since a number of fine particles affords a very much larger surface area in comparison with another number of particles which are the same in terms of weight but which are coarser, it is also easier to induce the fine particles to enter into a thermal reaction through the use of the incandescent device 20. Preferably, therefore, with the first filter stage 6 and the second filter stage 7 being densely packed, the incandescent device is disposed closer to the second filter stage 7. Upon exothermic reaction of the finer particles, the energy which is liberated in that situation is then sufficient also to cause thermal conversion of the coarser particles due to the first filter stage 6 without the need for an additional incandescent device. Therefore, in an embodiment used to promote an exothermic reaction, the insulating layer 21 advantageously has thermal conductivity or even catalytic properties.

Figure 7:
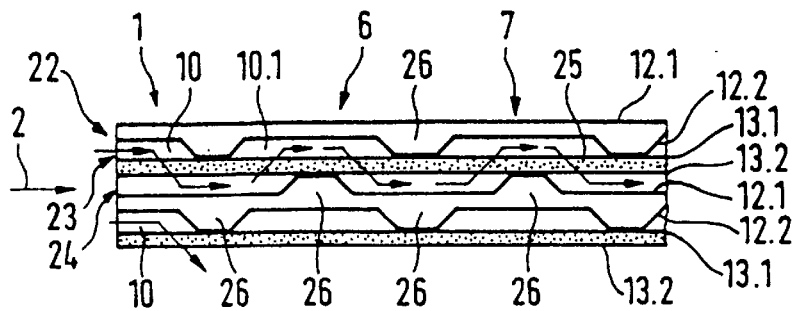
FIG. 7 is a sectional view of a portion of a through-flow of a filter body made up of layers.

FIG. 7 shows a portion of a filter body 1 which is constructed in a layer-wise manner. The gas flow 2 flows to the filter body 1 at a first end surface 22 thereof. There it is divided into different flow paths 10. As illustrated, in that configuration a first feed 23 and a second feed 24 are brought together in terms of flow to form a flow path 10.1. That combined flow path 10.1 is separated from the other flow paths 10 in its further progress through the filter body 1. In order to ensure that the flows are guided in that way, the filter body 1 is made up of gas-impermeable first layers 12.1, 12.2 and gas-permeable second layers with filter material 13.1, 13.2, which together form the first filter stage 6 and the second filter stage 7. A further material 25 is disposed between the two second layers with filter material 13.1 and 13.2. The further material 25 can be an insulating material as in FIG. 6, but it can equally also be a catalytically active material, for example a zeolite. It is likewise also possible to select an oxidation catalyst and to place it there, for example for exhaust gas treatment in the case of a Diesel engine. A catalyst material 25 is not adversely affected in terms of effectiveness due to its catalytically active layer being covered with particles, by virtue of prior filtering of the particle-laden gas flow 2 by the respective filter stages 6 and 7. They are retained previously. There are also cavities 26 between two gas-impermeable first layers 12.1 and 12.2 in the illustrated structure of a possible filter body 1. Those cavities 26 can serve as a feed device, for example for electric lines, or as flow passages for another flow of fluid. If the filter body 1 is operated, for example, at temperatures at which cooling is required, the cavities 26 can be used for a cooling fluid to flow therethrough. In particular, a fluid flow in the cavities 26, which is perpendicular to the direction of flow of the gas flow 2, then has advantages in regard to heat transfer, from an energy point of view. It will be appreciated that instead of cooling, the filter body 1 can also be heated, in which case mutually separate cavities 26 also permit selective heat transfer.

Figure 8:
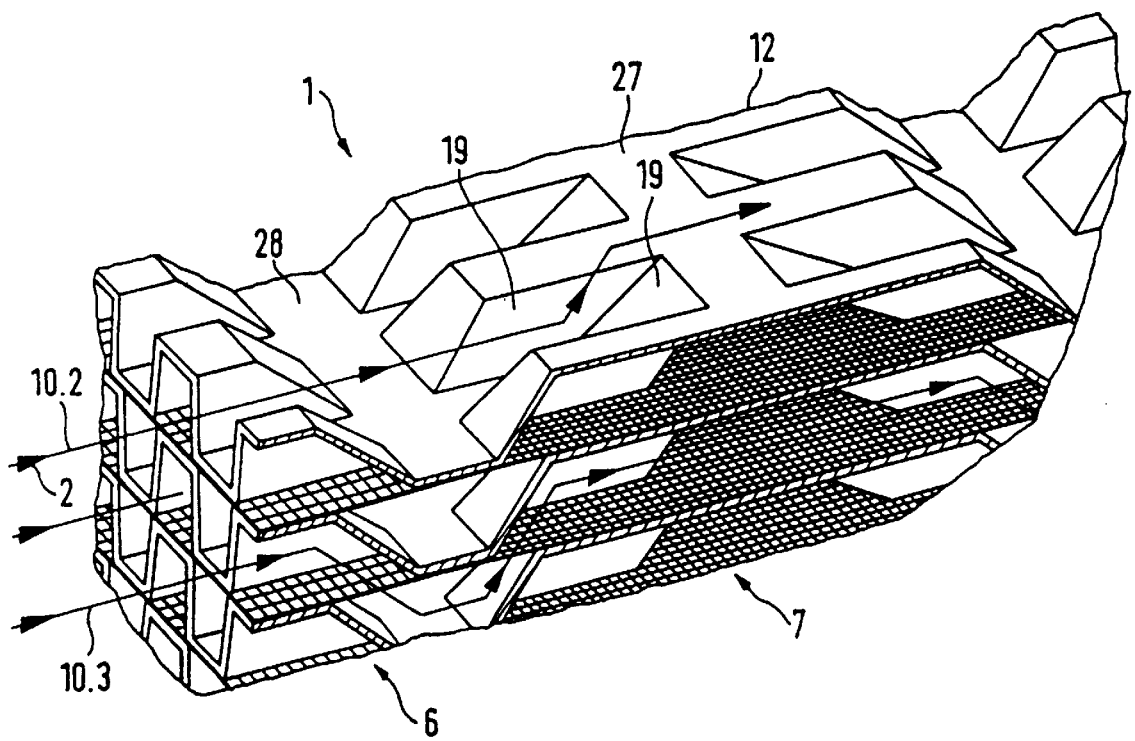
FIG. 8 is a fragmentary perspective view of a filter body with a first and a second filter stage.

FIG. 8 shows a portion of a further filter body 1 having a first filter stage 6 and a second filter stage 7 which in this embodiment are disposed separated from each other in the filter body 1. Two flow paths 10.2 and 10.3 are shown. They clearly illustrate the changes in direction which occur by virtue of the configuration of the gas-impermeable first layers 12. They have raised portions 27 and recesses 28. That configuration provides flow guide surfaces 19 for the respective flow paths 10.2, 10.3. FIG. 8 also shows a kind of flow path as has already been described with reference to FIG. 6. The flow paths 10.2 and 10.3 are separated from each other by virtue of the layer-wise structure of the filter body 1. However, there is a possibility of a division within the flow path 10.2, for example in the space formed by virtue of the recess 28 or the raised portion 27. Nonetheless the gas flow 2 as such remains on the predetermined flow paths 10.2. 10.3 which are separated from others.

Figure 9:
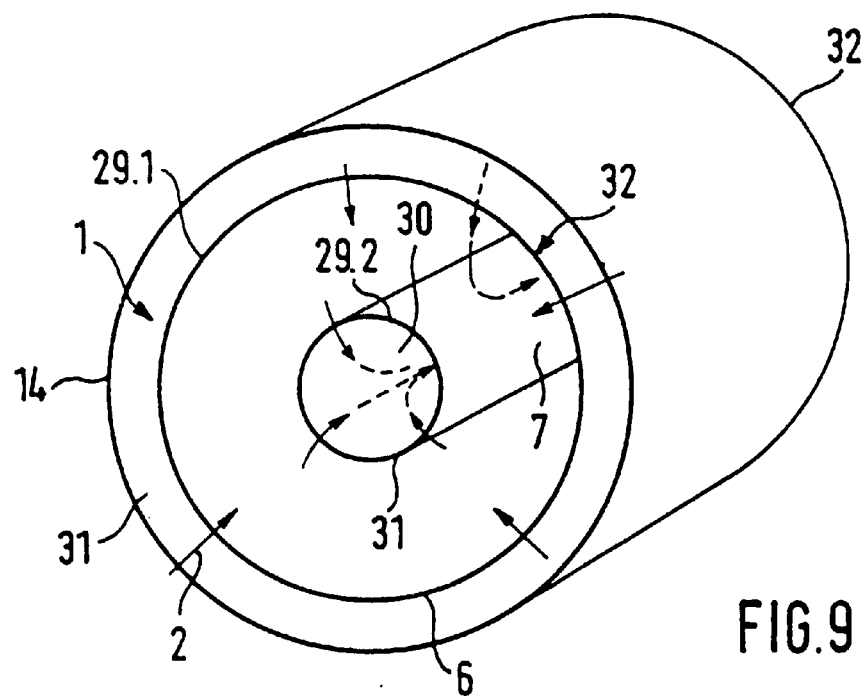
FIG. 9 is a perspective view showing the principle of a filter body involving a radial flow therethrough.

FIG. 9 is a diagrammatic view showing the principle of a further embodiment of a filter body 1 which is disposed in a tubular casing 14. The gas flows through the filter body 1 radially from the outside inwardly. For that purpose, in this embodiment it has first and second sleeves or tubes 29.1, 29.2 with a non-illustrated tube thickness. The gas flow 2 flows through the first tube 29.1 and then in this view through the second tube 29.2. The first tube 29.1 and the second tube 29.2 respectively form the first filter stage 6 and the second filter stage 7. The advantage of the radial flow through the configuration from the outside inwardly is that a larger diameter and thus a larger filter area are available at the first tube 29.1 than at the second tube 29.2. The gas flow 2 is discharged from the filter body 1 again from the interior 30 of the second tube 29.2. The tubes 29.1, 29.2 can each be made from different materials, for example ceramic or metal materials. Their porosity and their thickness can also be adapted depending on the respective situation of use involved. End surfaces 31 of the tubes 29.1, 29.2 themselves may be disposed, for example, in suitable holders so that the result in conjunction with the tubular casing 14 is respective closed end surfaces 32 for the filter body 1. That permits the filter body 1 to be acted upon by the gas flow 2 from the exterior, while the gas flow is discharged from the interior 30. It will be appreciated that it is possible to place not just two tubes 29.1 and 29.2 in a tubular casing 14, but it is possible to provide correspondingly more filter stages depending on the filter action wanted. The tubes 29.1, 29.2 can also be made up of layers, wherein a plurality of layers provides, for example, a tube 29.1 or 29.2. When the gas flow passes radially through the filter body 1, that configuration involves at the very minimum a single predetermined flow path 10. The flow path 10 extends from the outside inwardly or precisely the reverse. It is indicated by arrows denoting the gas flow 2. If, for example, there are support devices between the respective tubes 29.1, 29.2, they are desirably to be disposed in such a way as to ensure separation of flow paths from each other.

Figure 10:
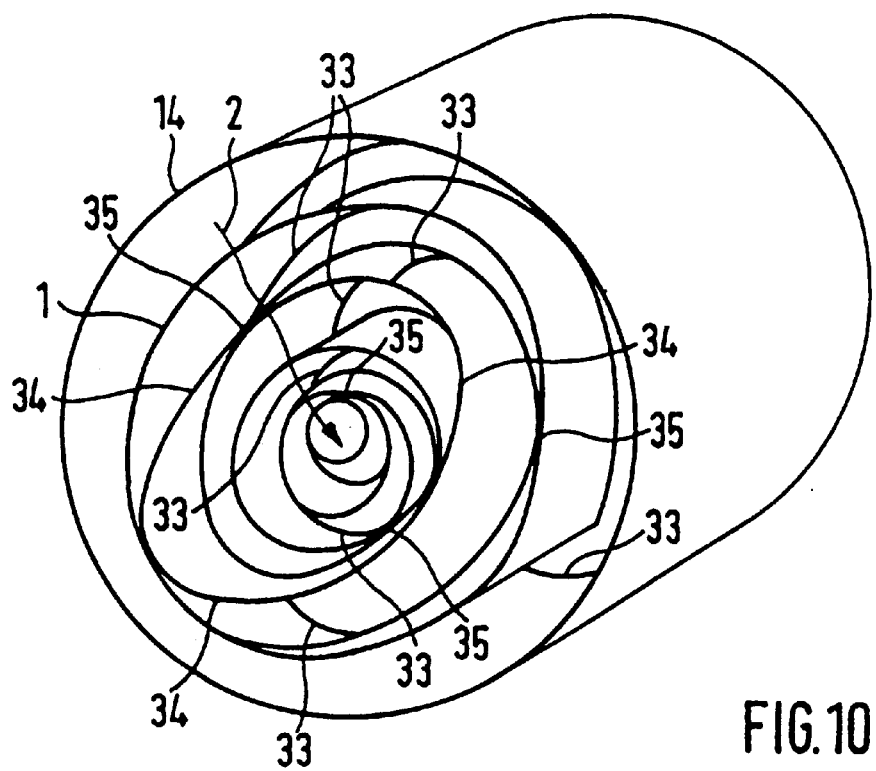
FIG. 10 is a perspective view of a further filter body through which gases can flow radially and which is of a wound or coiled nature.

FIG. 10 shows a filter body 1 through which the gas flow can also pass radially and which is again disposed in a tubular casing 14. This filter body 1 is wound or coiled, with separating webs 33 between individual turns or windings 34 providing for flow paths which are separated from each other. The windings 34 in turn are of such a configuration that they have contact points 35. They provide for subdivision of the filter body 1 in such a way that the gas flow 2 is compelled to flow through a winding 34 and thus necessarily a filter stage. When the windings 34 are metal layers the contact points 35 can be produced by the layers being squeezed or crushed at those locations. It will be appreciated that it is also possible to envisage corresponding configurations for dies in production processes such as sintering or extruding.

Figure 11:
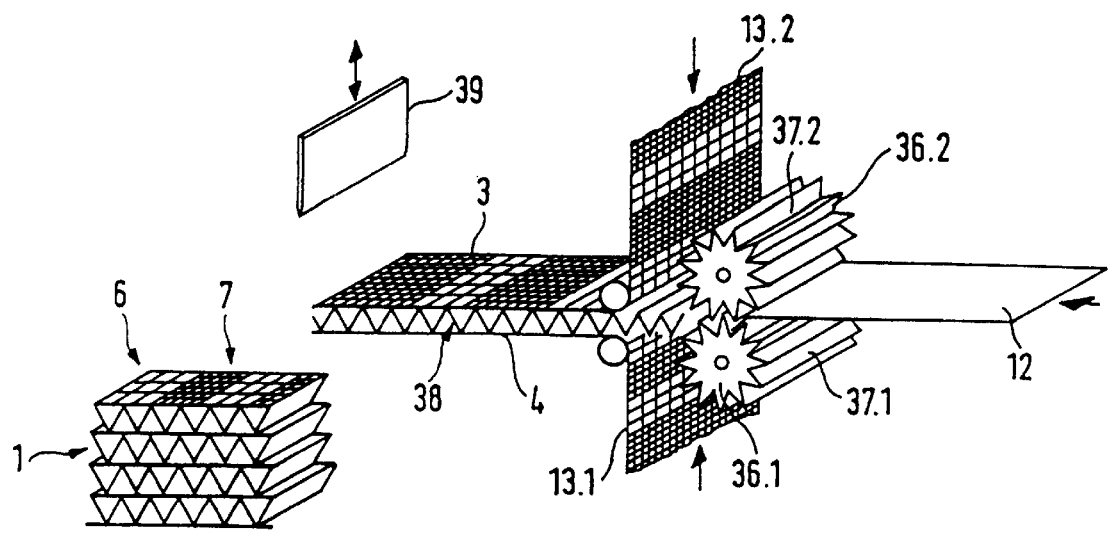
FIG. 11 is a perspective view illustrating a process for the production of a regeneratable and heat-resistant filter body.

FIG. 11 is a diagrammatic view showing the principle of a process for the production of a heat-resistant and regeneratable filter body 1. The filter body 1 having layers is produced to be similar to the portion illustrated in FIG. 3 by feeding a gas-impermeable first layer 12 to two shaping rollers 36.1 and 36.2 which are interengaged into each other. The shaping rollers 36.1 and 36.2 have a tooth configuration which is provided in such a way that a respective edge geometry 37.1 and 37.2 imparts a profile 38 to the gas-impermeable first layer 12. A lower second layer 13.1 and an upper second layer 13.2 of filter material are respectively applied as an upper layer 3 and a lower layer 4 to the gas-impermeable first layer 12 which is then profiled. The respective layers which are disposed one upon the other can then be joined together. That can be done through the use of brazing, welding or other joining procedures. The simultaneous feed of the gas-impermeable first layer 12 and the second layers 13.1 and 13.2 of filter material in the same working step also ensures the configuration of a first filter stage 6 and a second finer filter stage 7 in a flow path 10 of the filter body produced in that way. For that purpose, in the process illustrated therein, the two second layers 13.1 and 13.2 have different porosities over the extent thereof, thus providing the first filter stage 6 and the second filter stage 7 in the filter body 1. The respective layers 13.1, 12 and 13.2 which are then stacked one upon the other are cut up, for example, through the use of a cutting device 39 and then disposed in a layered configuration to form the filter body 1. Prior to the working procedure, the layers 13.1, 13.2 and 12 which are used may be pre-treated in such a way that subsequent post-treatment is no longer necessary. That concerns in particular catalytic coatings, corrosion protection or electrical and thermal insulation. In a development of the illustrated process, a plurality of such apparatuses are disposed in adjacent relationship, which make stacking of the cut-off portions unnecessary. Complete filter bodies 1 are then divided off. The illustrated profiling for the gas-impermeable first layer 12 is also not limited thereto. On the contrary, it is also possible for the second layers 13.1 and 13.2 of filter material to be profiled in addition or even on its own. In that respect the desired profiling is provided in accordance with the edge geometry 37.1 in conjunction with the oppositely disposed edge geometry 37.2 of the two shaping rollers 36.1 and 36.2. They may also have notches so that transverse bar portions are formed within the first and/or second layers. However, besides the shaping rollers 36.1 and 36.2 it is also possible to use other profiling tools which guarantee a continuous production procedure.

Figure 12:
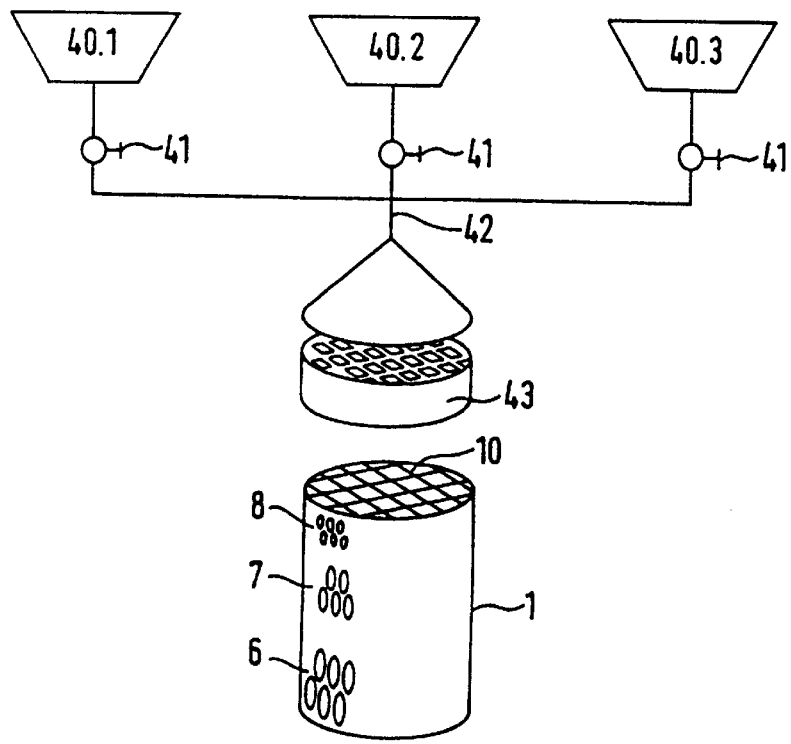
FIG. 12 is a partly perspective and partly schematic view illustrating a further process for the production of a filter body.

FIG. 12 shows another process in which at least a first filter stage 6 and a second finer filter stage 7 are disposed in a flow path 10, in the same working step as that in which the flow paths 10 are produced in the filter body 1. This diagrammatic view in FIG. 12 shows a first container 40.1, a second container 40.2 and a third container 40.3. They each contain a respective extrusion or sintering material of different porosity. The feed flow of the respective material is selected by way of valves 41 in such a way that the filter body 1 to be extruded or sintered is altered in terms of its porosity in accordance with a desired porosity for one of its filter stages 6 or 7, during the process for production of the flow paths 10. The starting material which can be mixed or separated in that way is fed by way of a common feed line 42 for all of the containers 40.1, 40.2 and 40.3 to a mold or die 43 which defines the structure of the filter body 1 with its flow paths 10. The illustrated filter body 1 then in each case has three different wall porosities which form the first filter stage 6, the second filter stage 7 and the third filter stage 8 by virtue of the choice of extrusion material or the mixture thereof. For that purpose it is necessary to ensure that the gas flow 2 passing through the filter body passes through the respective walls of the filter body 1. That is possible, for example, by using different dies 43 which have respectively different configurations so that the gas flow 2 must pass through the walls without passages of the filter body 1 having to be plugged in a further working step. This production process also presents itself for the production of a filter body including sleeves or tubes. Each tube to be produced is then preferably made only from one material.

The present invention provides a heat-resistant and regeneratable filter body which is particularly suitable for filtering even particle-charged gas flows with differing particle size distributions, without high pressure drops occurring. Due to its structure and its mode of manufacture, this filter body also affords the possibility of permitting it to be used in previously known filter systems in unmodified form in comparison with the filter forms earlier used therein. The systems which already exist do not have to be modified for that purpose. The process which is also afforded by the invention further permits the production of an inexpensive filter body of that kind as a mass-produced article without unnecessarily increasing the price for such filter bodies and filter installations related thereto.

I claim:

1. A heat-resistant and regeneratable filter body for retaining particles from a gas flow flowing through the filter body, comprising:

layers of gas-impermeable material forming flow guide surfaces defining mutually separate flow paths dividing a gas flow into a plurality of mutually separate partial gas flows and guiding said plurality of partial gas flows in a flow direction; and at least two filter devices including a first filter device and a second filter device disposed in succession in the flow direction in each of said mutually separate flow paths such that each of said partial gas flows first passes through said first filter device and then passes through said second filter device, said at least two filter devices having different filter openings with sizes decreasing in the flow direction, and at least one of said at least two filter devices being formed of alternate layers of filter material and said layers of gas-impermeable material.

2. The filter body according to claim 1, wherein said at least two filter devices are at least three filter devices having filter openings with sizes decreasing in the direction of the flow direction.

3. The filter body according to claim 1, wherein said layers of gas-impermeable material deflect the gas flow more than two times.

4. The filter body according to claim 1, including a layered or wound layer with a metal foil, at least one of said at least two filter devices being integrated with said layered or wound layer.

5. The filter body according to claim 1, wherein at least one of said filter devices has a trap at which filtered particles of said at least one filter device accumulate.

6. The filter body according to claim 1, wherein at least one of said filter devices is at least partially catalytically coated.

7. The filter body according to claim 1, wherein at least one of said filter devices has at least two different kinds of catalytically active coating.

8. The filter body according to claim 1, wherein said first device has a catalytically active coating promoting reduction, and at least one following filter device has a catalytically active coating promoting oxidation.

9. The filter body according to claim 8, wherein said catalytically active coating in said first filter device promotes reduction of nitrogen oxides, and said catalytically active coating in said at least one following filter device promotes oxidation of hydrocarbons.

10. The filter body according to claim 3, wherein at least one of said filter devices has at least two different kinds of catalytically active coating, and said layers of filter material have a different catalytically active coating than said layers of gas-impermeable material.

11. The filter body according to claim 10, wherein said layers of filter material have a coating reducing an ignition temperature of soot, and said layers of gas-impermeable material have an oxidation-promoting coating.

12. A heat-resistant and regeneratable filter body for retaining particles from a gas flow flowing through the filter body, comprising:

a first filter device and a second filter device;

layers of gas-impermeable material forming flow guide surfaces defining mutually separate flow paths through said first filter device and said second filter device, dividing a gas flow into a plurality of mutually separate partial gas flows and guiding said plurality of partial gas flows in a flow direction; and wherein said first filter device and said second filter device are disposed in succession in the flow direction in each of said mutually separate flow paths such that each of said partial gas flows first passes through said first filter device and then passes through said second filter device, wherein said first filter has a larger filter opening than said second filter device, and wherein at least one of said first filter device and said second filter device is formed of alternate layers of filter material and said layers of gas-impermeable material.

13. The filter body according to claim 12, further comprising additional filter devices having filter openings with sizes decreasing in the direction of the flow direction.

14. The filter body according to claim 12, wherein said layers of gas-impermeable material deflect the gas flow more than two times.

15. The filter body according to claim 12, including a layered or wound layer with a metal foil, at least one of said at least two filter devices being integrated with said layered or wound layer.

* * * * *